United States Patent
Sato

(10) Patent No.: US 7,616,718 B2
(45) Date of Patent: Nov. 10, 2009

(54) WIRELESS RECEIVER APPARATUS

(75) Inventor: Tadahiro Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 581 days.

(21) Appl. No.: 11/438,342

(22) Filed: May 23, 2006

(65) Prior Publication Data

US 2007/0201587 A1 Aug. 30, 2007

(30) Foreign Application Priority Data

Feb. 27, 2006 (JP) .............................. 2006-050643

(51) Int. Cl.
*H04L 27/08* (2006.01)
*H04B 1/06* (2006.01)

(52) U.S. Cl. .................................. 375/345; 455/232.1

(58) Field of Classification Search ................ 375/340, 375/342, 345, 355; 455/138, 232.1, 234.1
See application file for complete search history.

(56) References Cited

U.S. PATENT DOCUMENTS

| | | | | |
|---|---|---|---|---|
| 6,781,448 | B2 * | 8/2004 | Kawai | 329/304 |
| 6,859,505 | B2 * | 2/2005 | Agami et al. | 375/345 |
| 7,027,530 | B2 * | 4/2006 | McFarland et al. | 375/341 |
| 7,257,177 | B2 * | 8/2007 | Ruohonen | 375/345 |
| 7,277,685 | B2 * | 10/2007 | Liu et al. | 455/240.1 |
| 7,295,517 | B2 * | 11/2007 | Anim-Appiah et al. | 370/232 |
| 2004/0190560 | A1 * | 9/2004 | Maltsev et al. | 370/503 |
| 2007/0230635 | A1 * | 10/2007 | Wilhelmsson et al. | 375/345 |
| 2008/0043858 | A1 * | 2/2008 | Lim et al. | 375/260 |

FOREIGN PATENT DOCUMENTS

JP 2003-92561 3/2003

OTHER PUBLICATIONS

Thompson J. et al.: an Integrated 802.11a Baseband and MAC Processor Solid-State Circuits Conference, 2002 Digest of Technical Papers. 2002 IEEE International Feb. 3-7, 2002, Piscataway, NJ, USA, IEEE, vol. 1, 2002, pp. 126-451, XP010585493 ISBN: 0-7803-7335-9.

Gil Jimenez V P et al: "Design and Implementation of Synchronization and AGC for OFDM-Based WLAN Receivers" IEEE Transactions on Consumer Electronics, IEEE Service Center, New York, NY, US, vol. 50, No. 4, Nov. 2004, pp. 1016-1025, XP001224735, ISSN: 0098-3063.

* cited by examiner

*Primary Examiner*—Khanh C Tran
(74) *Attorney, Agent, or Firm*—Hanify & King, PC

(57) ABSTRACT

When carrying out a channel compensation of a data symbol, a channel estimation value of the reference symbol of the frame itself and that of a reference symbol of the preceding frame are used. In this event, if an AGC gain at the time of a channel estimation value by a reference symbol of the frame itself is different from that of a frame of the reference symbol of the preceding frame, and if an AGC gain of the reference symbol of the frame itself is the same as that of a data symbol to be subjected to a transmission compensation, then the channel estimation value by the reference symbol of the preceding frame is corrected so as to cancel the difference of the AGC gains, followed by using it for a channel compensation of the data symbol.

12 Claims, 20 Drawing Sheets

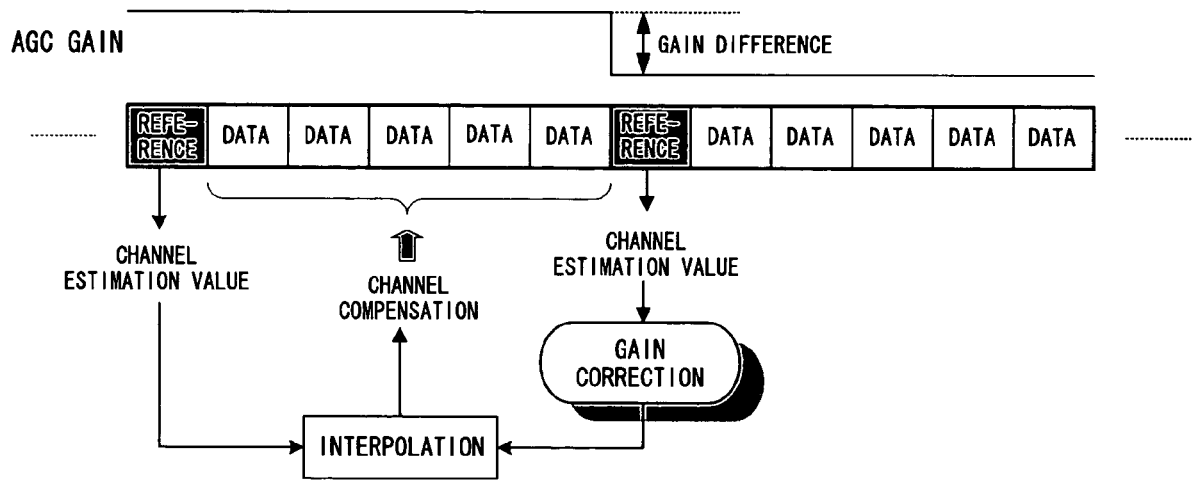
F I G. 8

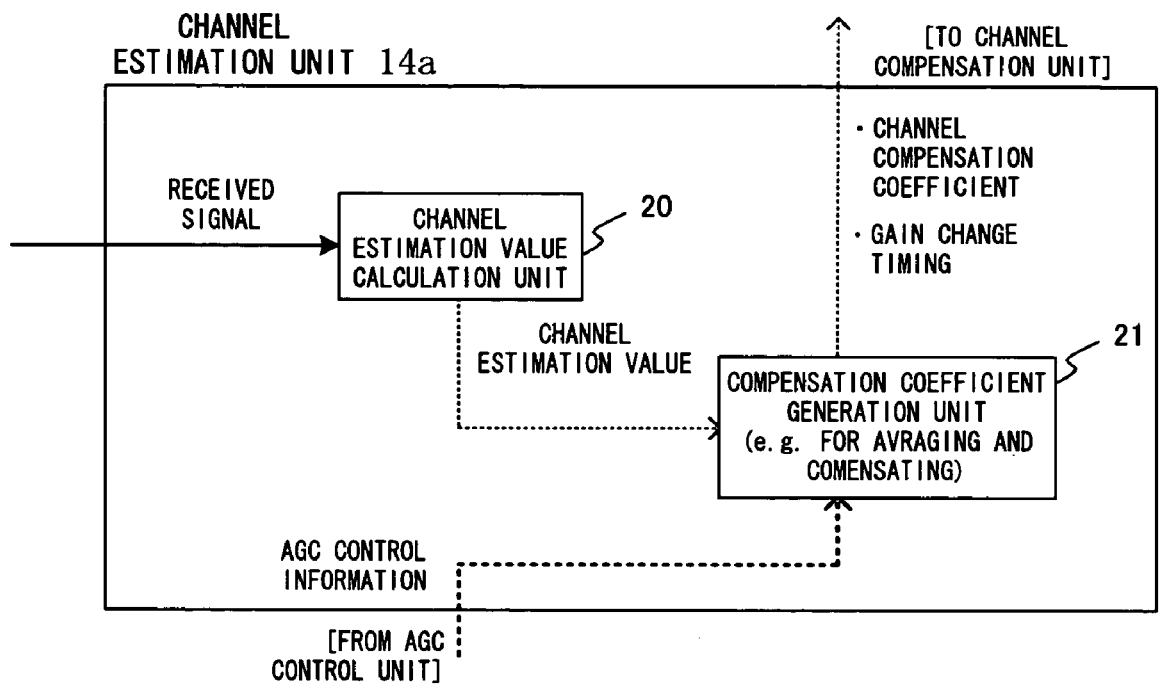
F I G. 1 9

AGC GAIN ─────────────────────────

AGC GAIN         ↕ GAIN DIFFERENCE

WIRELESS RECEIVER APPARATUS

BACKGROUND OF THE INVENTION

1. Field of the Invention

The present invention relates to a wireless receiver apparatus comprising an automatic gain control function.

2. Description of the Related Art

FIG. 1 exemplifies a frame format used for a wireless telecommunication transmission system.

Referring to FIG. 1, one frame is comprised by one reference symbol and five data symbols, with the reference symbol being time-multiplexed in relation to the data symbols at a constant interval. Note that there is no need of five data symbols existing relating to one reference symbol, and other comprisals are also the same. The term "reference symbol" corresponds to "pilot symbol" in the W-CDMA system, whereas the present specification uses the term "reference symbol" in order to discuss more generally.

A wireless receiver apparatus performs a channel estimation and demodulates a data symbol by compensating for a channel response. A channel estimation circuit calculates a correlation between reference symbols received at a constant interval and a known reference pattern, thereby performing a channel estimation. A channel compensation circuit compensates for a channel response of data symbols by using a channel estimation value.

Here, in the case of demodulating data symbols of a certain frame, a channel estimation value acquired from the reference symbol of the same frame is utilized. Or a use of the reference symbol of an adjacent frame in addition to the reference symbol of the same frame enables an improvement of channel estimation accuracy. For instance, it is possible to suppress a noise component by averaging channel estimation values acquired from the respective reference symbols of two frames and thereby improve channel estimation accuracy. Alternatively, an interpolation of two channel estimation values makes it possible to estimate a channel estimation value at each data symbol position highly accurately even in the case that a variation amount of a channel response changes faster as compared to a frame length due to a Doppler effect.

FIGS. 2 through 4 are block diagrams exemplifying a configuration of a wireless receiver apparatus used for a wireless telecommunication system.

A common wireless receiver apparatus is equipped with an automatic gain control function (AGC) for varying a gain according to a level (i.e., a power or a voltage) of a received signal, and comprises an antenna 10, an AGC amplification unit 11, an AGC control unit 12, an A/D (analog-digital) converter 13, a channel estimation unit 14 and a channel compensation unit 15 as shown in FIG. 2. Note that the AGC control unit 12, channel estimation unit 14 and channel compensation unit 15 are included in a signal process unit 16 and are disposed for digitally processing a digital signal by using a DSP, et cetera.

The AGC control unit 12 raises a gain of the AGC amplification unit 11 (i.e., an AGC gain) when an input level is low relative to a certain target level, while it lowers the AGC gain when the input level is high relative to the target level, thereby controlling a received signal level at constant prior to the A/D converter 13 and accomplishing a wide dynamic range.

As for the AGC function in this part, the control is carried out by digital processing, in lieu of controlling by way of an analog AGC voltage, in order to improve accuracy of a gain control. This configuration makes an AGC gain change in steps relative to a received level.

FIG. 3 is a block diagram showing an internal configuration of the AGC control unit 12.

An input level measurement unit 17 comprised by the AGC control unit 12 measures an input level of a digitalized received signal sent from the A/D converter 13 and inputs input level information to an AGC control value calculation unit 18 in which a target level is provided as a parameter value and an AGC control value is calculated here so as to make the input level close to the target level. The calculated AGC control value is sent to the AGC amplification unit 11 and used for controlling an AGC gain thereof.

FIG. 4 is a block diagram showing an internal configuration of the channel estimation unit 14.

A digitalized received signal from the A/D converter 13 is input to a channel estimation value calculation unit 20 which then calculates a channel estimation value by using a reference symbol. The calculated channel estimation value is input to a compensation coefficient generation unit 21 which then calculates a channel compensation coefficient to be provided to the channel compensation unit 15. A method for calculating a channel compensation coefficient includes the one as described above.

A receiver apparatus using a conventional channel estimation includes the one as noted by a patent document 1 which notes a technique for retaining a gain of an amplifier for each period between a reference symbol to the next one and making an updating timing of the gain at a positive multiple timing of a reference symbol.

[Patent document 1] Japanese Patent Application Publication No. 2003-92561

An AGC function of a common wireless receiver apparatus changes an AGC gain at a timing asynchronously with a main signal. And it demodulates a data symbol without considering a fact of an AGC gain being changed also when performing channel compensation. The above described results in the problem of an error rate characteristic being deteriorated if AGC gains are different between a data symbol to be demodulated and a reference symbol for calculating a channel estimation value.

And if AGC gains are different among a plurality of reference symbols for performing channel estimations, a channel estimation value is added by an amplitude fluctuation effect due to the difference of the AGC gains, thereby resulting in the problem of degrading an error rate characteristic if a channel compensation is carried out by averaging or linearly interpolating the channel estimation value as is.

SUMMARY OF THE INVENTION

An object of the present invention is to provide a wireless receiver apparatus capable of carrying out channel compensation without deteriorating a data error rate as much as possible even when AGC gains fluctuate.

A wireless receiver apparatus according to the present invention comprises a gain value acquisition unit for acquiring a gain value of the amplification unit; and a channel compensation unit for acquiring a channel estimation value by using a reference symbol included in a data frame, and carrying out a channel compensation by considering a difference of the gain values if a gain value of the amplification unit at the time of the channel estimation value being acquired is different from the one at the time of a data symbol to be subjected to a channel compensation being acquired when subjecting the data symbol to a channel compensation.

A consideration of an updating timing of an AGC gain and of an AGC gain difference between the pre- and post-updates makes it possible to suppress a distortion of a received signal due to a difference of AGC gains, thereby enabling a highly accurate channel estimation, resulting in improving a data error rate characteristic.

BRIEF DESCRIPTION OF THE DRAWINGS

FIG. 8 is a diagram describing a channel compensation method proposed by the embodiment of the present invention (part 4);

FIG. 19 shows an internal configuration of a channel estimation unit 14a in order to implement FIGS. 11 through 13.

DESCRIPTION OF THE PREFERRED EMBODIMENTS

A preferred embodiment of the present invention is configured to enable a highly accurate data demodulation by avoiding a distortion of a received signal due to a difference in AGC gains.

A wireless receiver apparatus according to the embodiment of the present invention is configured to change over calculation methods of a transmission estimation value depending on a presence or absence of a change in AGC gain. The apparatus comprehends a timing at which an AGC gain is updated and the pre- and post-updated AGC gain values, making it possible to determine a frame for a reference, calculate an AGC gain difference relative to the frame and calculate a channel estimation value based on these pieces of information, thereby being capable of carrying out a highly accurate data demodulation.

Particularly, in the case of the AGC gains being changed, what is conceivable is to carry out a channel compensation by using a channel compensation coefficient which is obtained by using a reference symbol of which the gain is the same as a data symbol in lieu of processing such as averaging or interpolating of the channel estimation value acquired from the reference symbol of each frame. This method is effective in the case of an AGC gain change being performed only infrequently, such as an update cycle of AGC gains being very long, and is possible to implement by adding a simple circuit.

FIGS. 5 through 13 are diagrams describing channel compensation methods proposed by the embodiment of the present invention.

Figure 5:
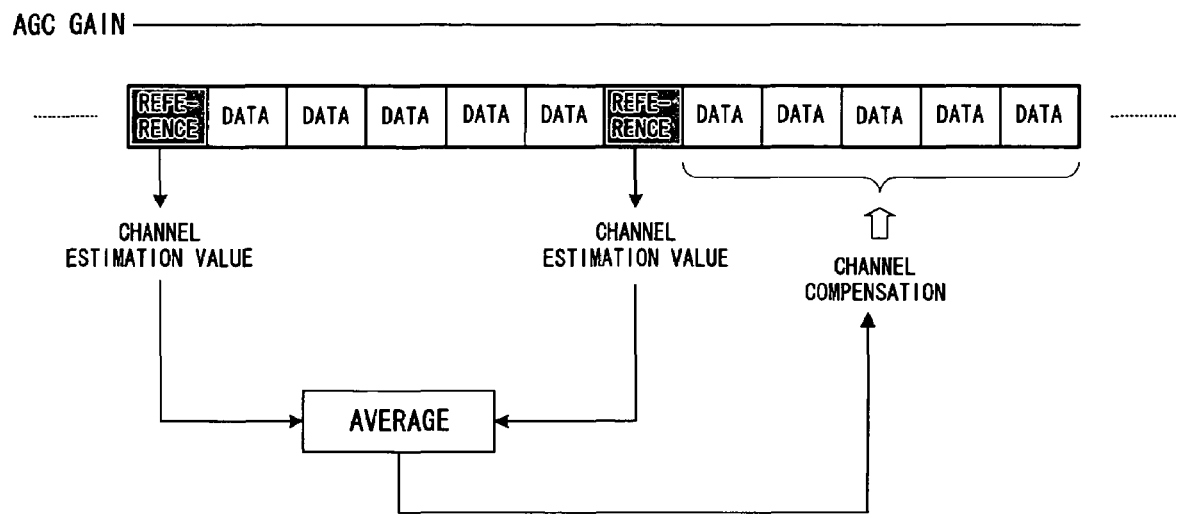
FIG. 5 is a diagram describing a channel compensation method proposed by an embodiment of the present invention (part 1)

FIG. 5 shows a channel compensation method in the case of a constant AGC gain. This case acquires the reference symbol of a frame and a channel estimation value of the reference symbol of the preceding frame and uses the average of these values when carrying out a channel compensation for a data symbol of a certain frame as in the conventional method.

Figure 6:
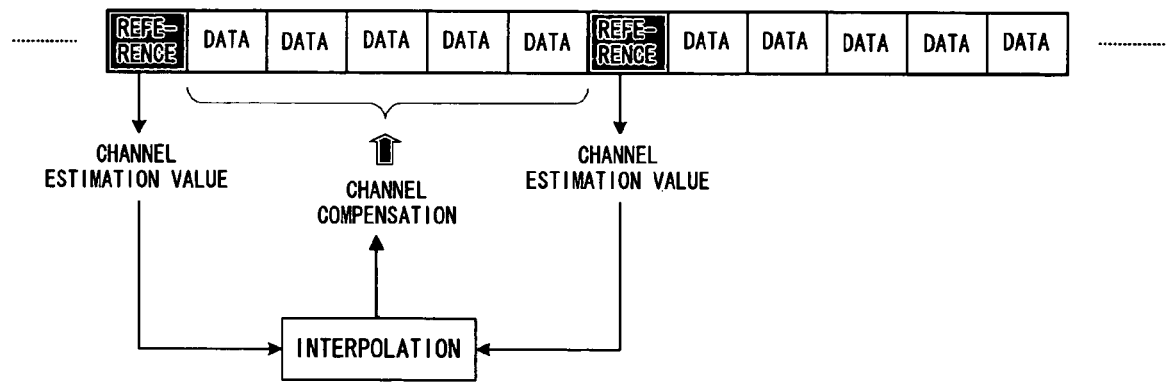
FIG. 6 is a diagram describing a channel compensation method proposed by the embodiment of the present invention (part 2)

FIG. 6 is a diagram describing another example of a channel compensation method in the case of a constant AGC gain. This case acquires the reference symbol of a frame and a channel estimation value of the reference symbol of the succeeding frame and uses an interpolated value of these values. The interpolation is based on the consideration that a channel estimate of a data symbol existing between the reference symbol of the applicable frame and that of the succeeding frame is probably a result of one estimation value gradually changing to the other, with the channel estimation values obtained from these reference symbols being at either end. Although it is not possible to measure how the estimation value changes gradually, a prediction of the change by a linear interpolation, et cetera, is expected to enable accurate channel compensation.

Figure 7:
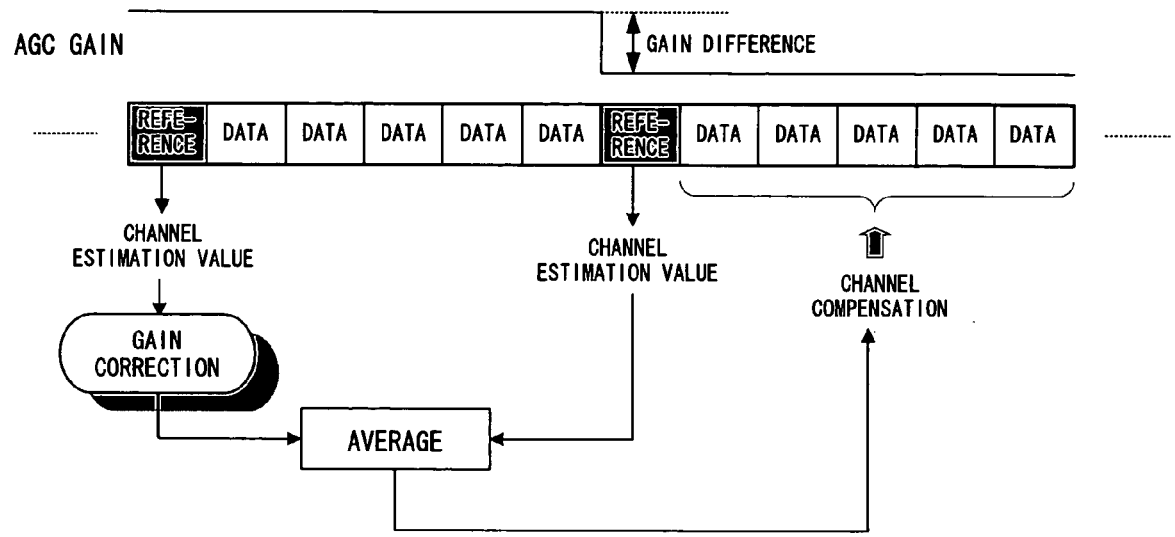
FIG. 7 is a diagram describing a channel compensation method proposed by the embodiment of the present invention (part 3)

FIG. 7 is a diagram describing the case of an AGC gain changing at the head of a frame to be subjected to channel compensation. In the case of demodulating a data symbol of a certain frame, the average of transmission estimation values obtained from the respective reference symbols of the preceding and applicable frames is used. Because the AGC gains of the respective reference symbols of the preceding and applicable frames are different, the difference of the AGC gains is corrected vis-à-vis a channel estimation value calculated from the reference symbol of the preceding frame, as the applicable frame as reference, followed by merely performing averaging processing. This makes it possible to suppress a noise component and hence demodulate data highly accurately. This also makes it possible to demodulate data with little delay because the demodulation processing is enabled by using a channel estimation value which is acquired from the preceding reference symbol in terms of time.

It is also possible to apply a method shown in FIG. 7 to a channel compensation method using an interpolation as shown in FIG. 8. The case of demodulating a data symbol of a certain frame applies a linear interpolation between channel estimation values acquired from the respective reference symbols of the applicable frame and the succeeding frame. If the AGC gains of the respective reference frames for the applicable and succeeding frames, the difference in the AGC gains is corrected for a channel estimation value calculated from the reference symbol of the succeeding frame, with the applicable frame as reference, followed by merely performing interpolation processing. This makes it possible to estimate a channel highly accurately even in the case of quick variation of a channel response, thereby enabling a demodulation of data in high accuracy.

FIGS. 7 and 8 show the case of changing AGC gains immediately before a reference symbol, the embodiment of the present invention, however, can be applied to a case of AGC gains being changed in the middle of a frame.

Figure 9:
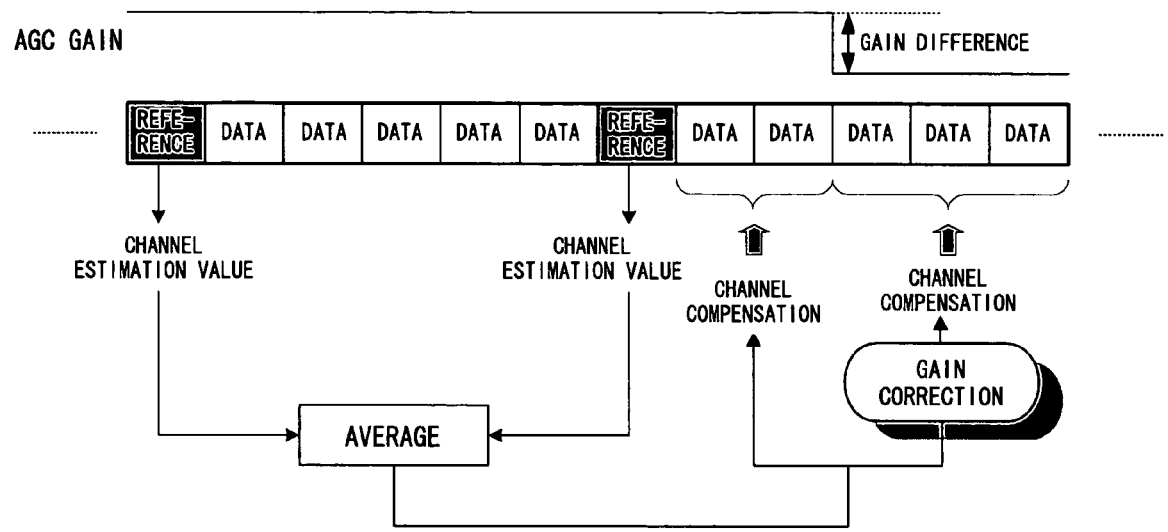
FIG. 9 is a diagram describing a channel compensation method proposed by the embodiment of the present invention (part 5)
Figure 10:
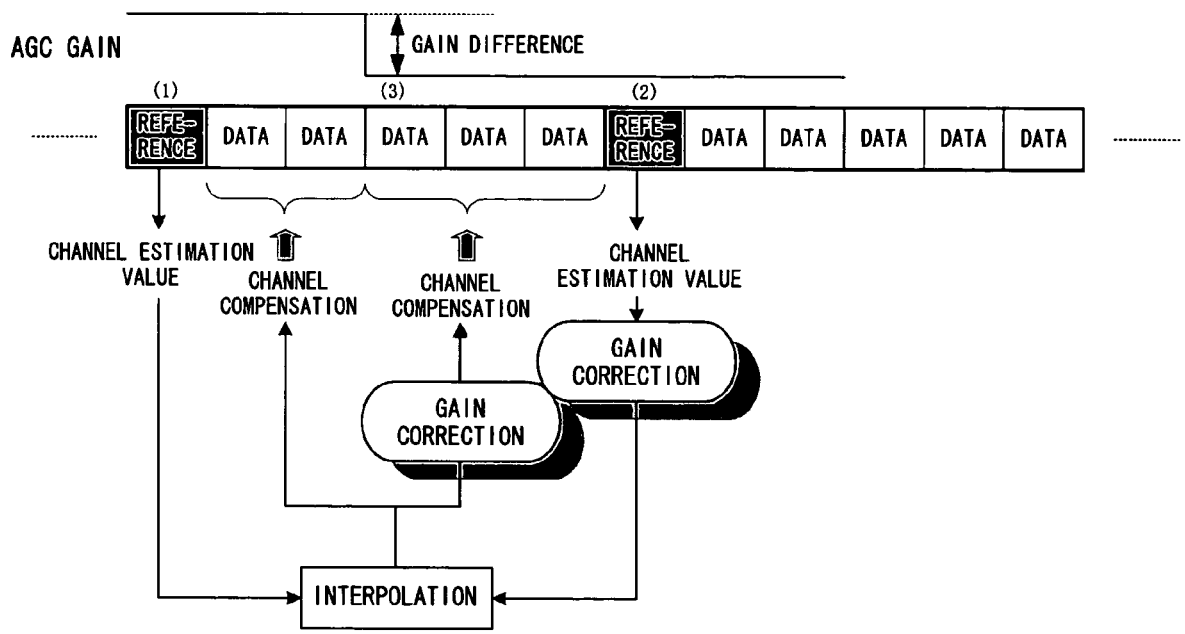
FIG. 10 is a diagram describing a channel compensation method proposed by the embodiment of the present invention (part 6)

For example, a modification with a changed amount of AGC gains, followed merely by compensating as shown in FIGS. 9 and 10.

That is, the case shown in FIG. 9 acquires respective channel estimation values by using the reference symbol of a certain frame and that of the preceding frame, averages the two and thereby carries out a channel compensation of the data symbol of the applicable frame. If, however, the gain is the same as that at the time of receiving the reference symbol, the averaged and acquired channel compensation coefficient is used as is, while, if after the gain is changed, a correction is applied to the channel compensation coefficient by the changed amount of the gain, followed by carrying out a channel compensation for the data symbol.

Likewise, the case of FIG. 10 channel estimation values by using the reference symbol of a certain frame and that of the succeeding frame are obtained, are used for interpolation and thereby carries out a channel compensation of the data symbol of the applicable frame. If, however, the gain is the same as that at the time of receiving the reference symbol, the interpolated and acquired channel compensation coefficient is used as is, while if after the gain is changed, a correction is applied to the channel compensation coefficient with the changed amount of the gain, followed by carrying out a channel compensation of the data symbol. Note that in a channel estimation of the reference symbol of the succeeding frame, the gain is already changed, and therefore a correction due to the gain change is applied also to a transmission estimation value using the reference symbol of the succeeding frame.

Note that the embodiment of the present invention is capable of correcting a phase variation amount in addition to an amplitude associated with a change in AGC gains if the fact that changing the AGC gain also varies a phase of a received signal is known.

Figure 11:
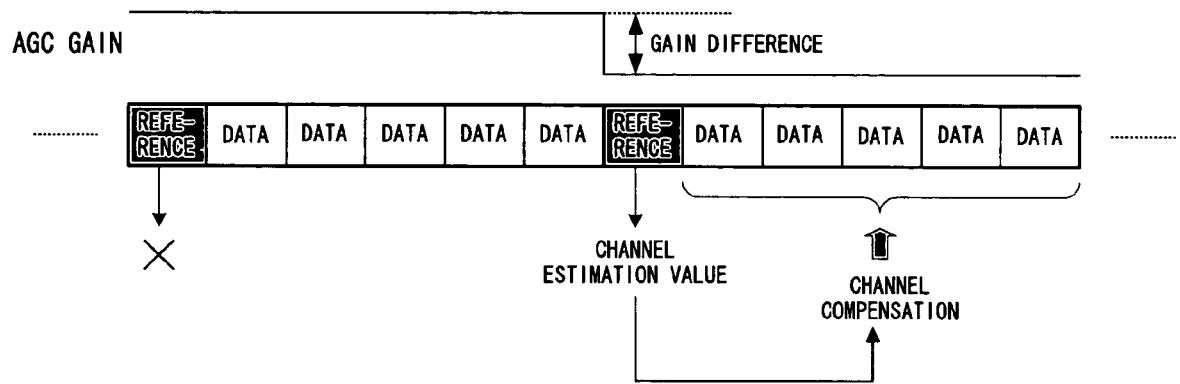
FIG. 11 is a diagram describing a channel compensation method proposed by the embodiment of the present invention (part 7)
Figure 12:
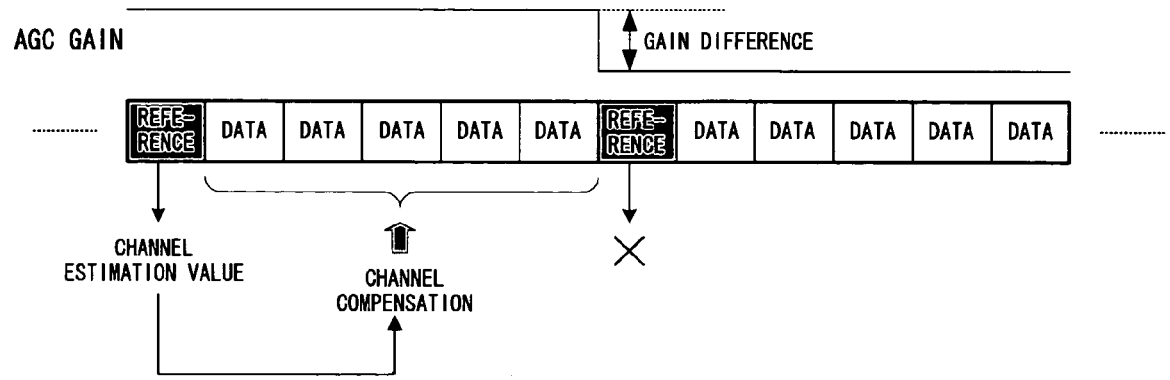
FIG. 12 is a diagram describing a channel compensation method proposed by the embodiment of the present invention (part 8)
Figure 13:
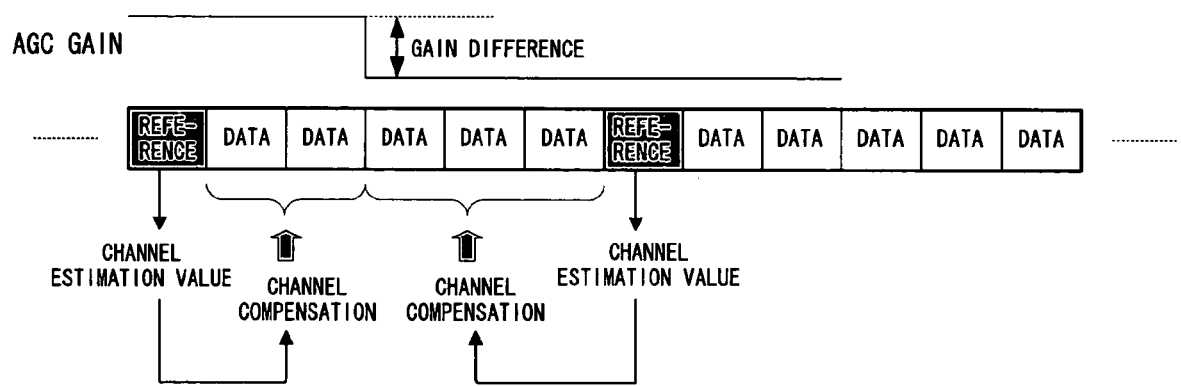
FIG. 13 is a diagram describing a channel compensation method proposed by the embodiment of the present invention (part 9)

FIGS. 11 through 13 show other channel compensation methods.

As shown in FIGS. 11 through 13, if AGC gains are different for two reference symbols, a conceivable method is not to perform processing such as averaging and interpolating of channel estimation values acquired from the respective reference symbols of the frames. That is, to carry out a channel compensation for the data symbol by using only a channel estimation value using the reference symbol under the condition of the same gain as the data symbol to be demodulated. This method enables an implementation by addition of a simple circuit.

The embodiment of the present invention can also be applied to processing if a plurality of reference symbols is multiplexed to a single frame by the same method. It can also be applied to processing if likewise straddling to three or more frames.

The embodiment of the present invention is characterized to install an AGC gain correction function for the conventional receiver apparatus, and a channel estimation circuit or a calculation process circuit for averaging and interpolating, et cetera, can be applied by the same circuit as the conventional technique. Also in another example, it is possible to prevent degradation due to an AGC function, if AGC gains are different, by invalidating a calculation process such as averaging, interpolating, et cetera, and using a channel estimation value using the reference symbol under the condition of the same gain as a data symbol to be demodulated. Accordingly, an increased circuit size according to the embodiment of the present invention does not make a material problem.

Figure 14:
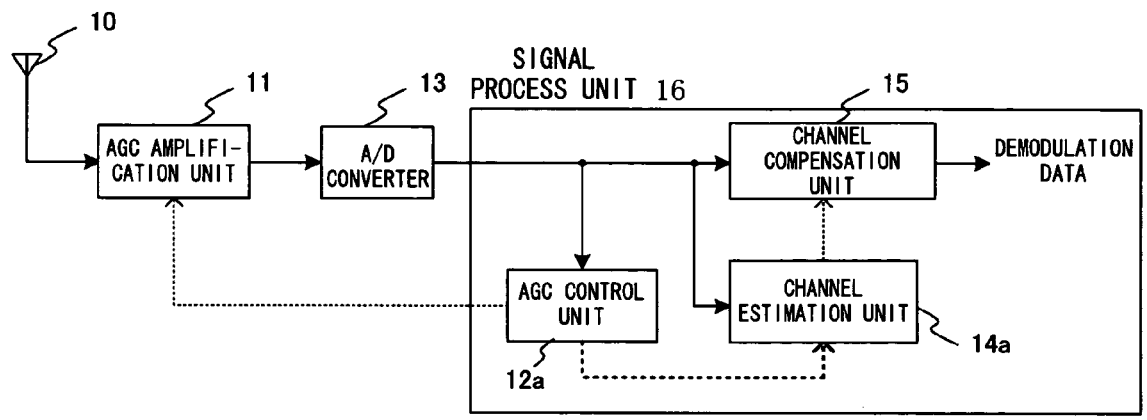
FIG. 14 shows an example configuration of a wireless receiver apparatus according to the embodiment of the present invention.

FIG. 14 shows an example configuration of a wireless receiver apparatus according to the embodiment of the present invention.

Figure 1:
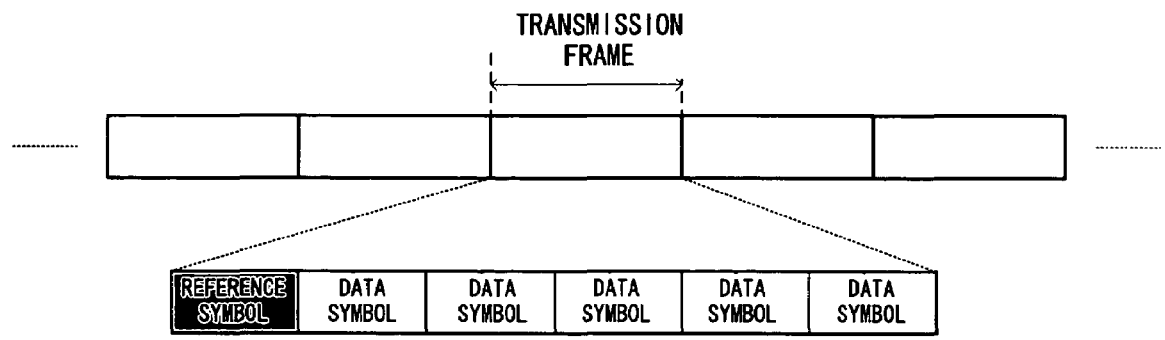
FIG. 1 exemplifies a frame format used for a wireless telecommunication transmission system.
Figure 2:
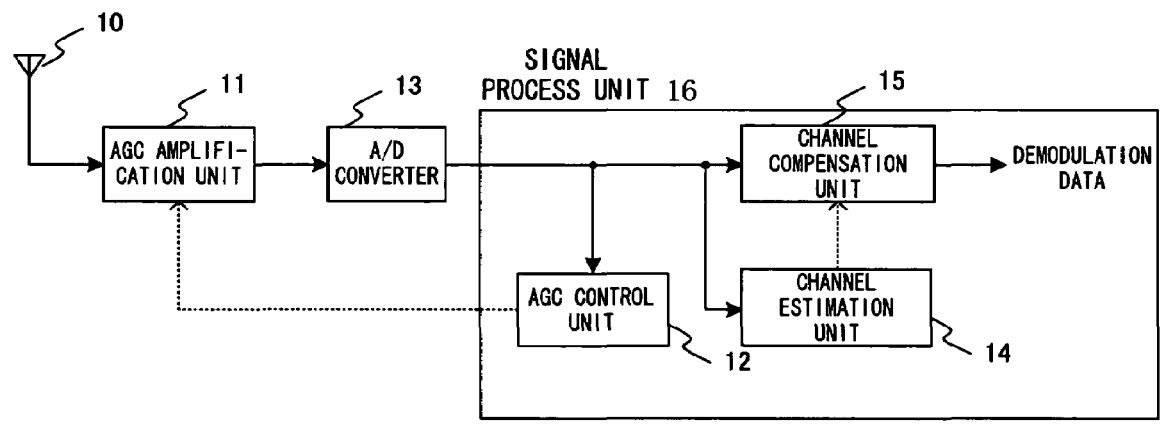
FIG. 2 is a block diagram exemplifying a configuration of a wireless receiver apparatus for a wireless telecommunication system (part 1)

In the showing of FIG. 14, the same reference signs are assigned to the same components as in FIG. 2. A signal received at an antenna 10 is amplified at an AGC amplification unit 11, and is converted into a digital signal from an analog signal at an A/D conversion unit 13. A signal process unit 16 processes a digital signal. An AGC control unit 12*a* first measures an amplitude level of a received signal output from the A/D conversion unit 13 and judges whether or not the amplitude level is appropriate. If the amplitude level is judged to be not appropriate, it controls a gain of the AGC amplification unit 11 so as to make the amplitude level of the digital received signal, i.e., an output of the A/D conversion unit 13, an appropriate value. In this event, the embodiment of the present invention is configured such that the AGC control unit 12*a* inputs, to a channel estimation unit 14*a*, a timing of the gain change and a gain value provided to the AGC amplification unit 11.

The channel estimation unit 14*a* extracts a reference symbol from the output of the A/D conversion unit 13, compares with a predetermined pattern of the reference symbol and calculates a channel estimation value. It then refers to the timing of a gain change and the gain value which are sent from the AGC control unit 12*a* and calculates a channel compensation coefficient to be provided to a channel compensation unit 15. For calculating a channel compensation coefficient, either one of the methods described in association with FIGS. 5 through 13 is applied. For example, if the channel estimation unit 14*a* has adopted the method of acquiring a channel compensation coefficient by calculating the average of channel estimation values of respective reference symbols of two frames, it judges as to under which gain the reference symbol used for calculating the channel estimation value is obtained, from the change timing of the gain which is provided by the AGC control unit 12*a* and, if the two reference symbols are obtained under the condition of different gains, applies an AGC correction to the channel estimation value obtained from one reference symbol by using a gain value obtained from the AGC control unit 12*a* so as to match with the gain of a data symbol to be subjected to a channel compensation, thereby calculating the channel compensation coefficient. Alternatively, it acquires a channel compensation coefficient by using only a channel estimation value using a reference symbol obtained under the condition of the same gain as that of a data symbol to be subjected to channel compensation. If two reference symbols are obtained under the condition of the same gain and yet the data symbols are obtained under the condition of different gains, a channel estimation value obtained by using two reference symbols is applied by an AGC correction by using the gain value obtained from the AGC control unit 12a to acquire a channel compensation coefficient, thereby carrying out the channel compensation of the aforementioned data symbol.

The processing is similar in the case of the channel estimation unit 14a acquiring a channel compensation coefficient by interpolating a channel estimation value obtained from two reference symbols. That is, it judges as to under which gain the reference symbol used for calculating the channel estimation value is obtained, from the change timing of the gain which is provided by the AGC control unit 12a and, if the two reference symbols are obtained under the condition of different gains, applies an AGC correction to the channel estimation value obtained from one reference symbol by using a gain value obtained from the AGC control unit 12a so as to match with the gain of a data symbol to be subjected to a channel compensation, thereby calculating the channel compensation coefficient. Alternatively, it acquires a channel compensation coefficient by using only a channel estimation value using a reference symbol obtained under the condition of the same gain as that of a data symbol to be subjected to channel compensation. If two reference symbols are obtained under the condition of the same gain and yet the data symbols are obtained under the condition of different gains, a channel estimation value obtained by using two reference symbols is applied by an AGC correction by using the gain value obtained from the AGC control unit 12a to acquire a channel compensation coefficient, thereby carrying out the channel compensation of the aforementioned data symbol.

The channel compensation unit 15 carries out channel compensation of a data symbol by using the channel compensation coefficient obtained from the channel estimation unit 14a. Note that it is necessary to memorize a data symbol in the case of carrying out channel compensation of the data symbol by using a channel estimation value based on a reference symbol incoming later as shown by FIG. 10 or 13. Accordingly the channel compensation unit 15 is configured to include memory, et cetera, capable of memorizing data symbols of one frame size or greater. The channel estimation unit 14a is configured to notify the channel compensation unit 15 of a timing of gains having changed, and the channel compensation unit 15 is configured to stop channel compensation processing, if a gain is changed, until a newly calculated channel compensation coefficient, which is calculated in association with the gain change, is input from the channel estimation unit 14a and accumulate data symbols in the memory. Then, it reads the data symbols from the memory and carries out channel compensation when a channel compensation coefficient is input anew.

Figure 15:
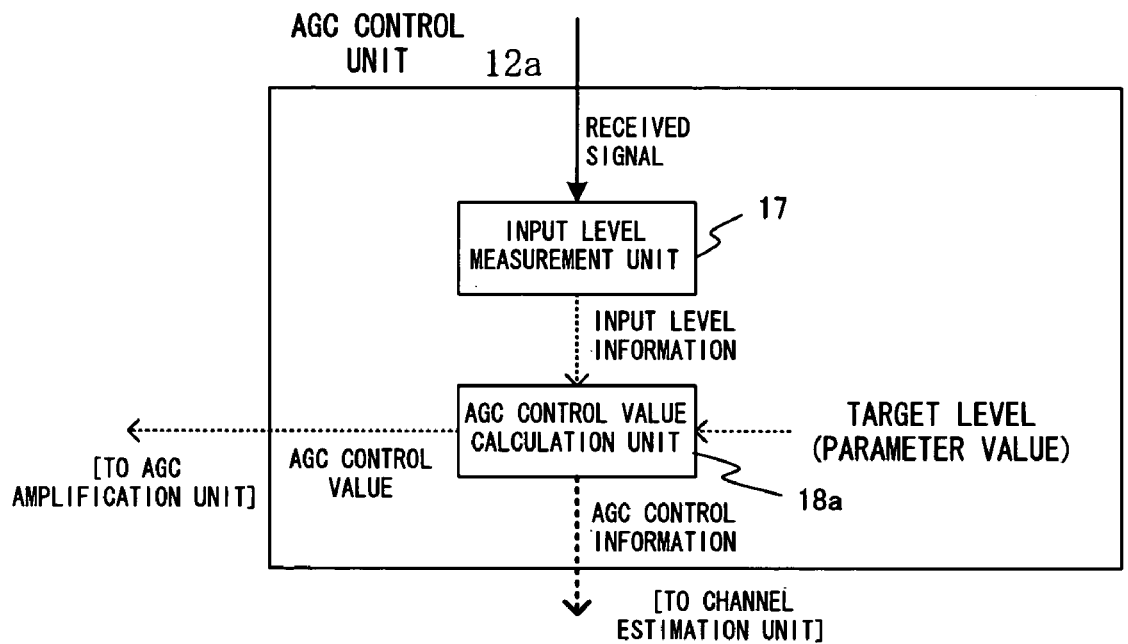
FIG. 15 is an internal configuration diagram of the AGC control unit 12a shown by FIG. 14.

FIG. 15 is an internal configuration diagram of the AGC control unit 12a shown in FIG. 10.

Figure 3:
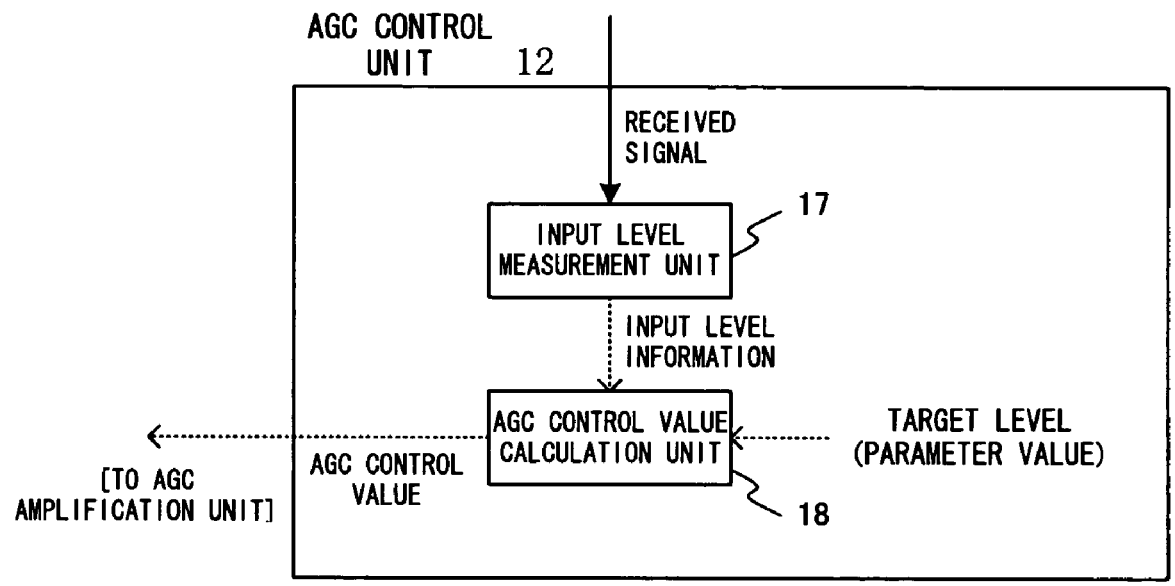
FIG. 3 is a block diagram exemplifying a configuration of a wireless receiver apparatus for a wireless telecommunication system (part 2)

In the showing of FIG. 15, the same reference signs are assigned to the same components as in FIG. 3. As an input level measurement unit 17 measures an input amplitude level of a received signal, the measurement value is input to an AGC control value calculation unit 18a as input level information. In the configuration shown in FIG. 15, the AGC control value calculation unit 18a not only outputs an AGC control value to the AGC amplification unit but also sends AGC control information to the channel estimation unit. The AGC control information includes an AGC gain, a gain change timing, et cetera.

Figure 16:
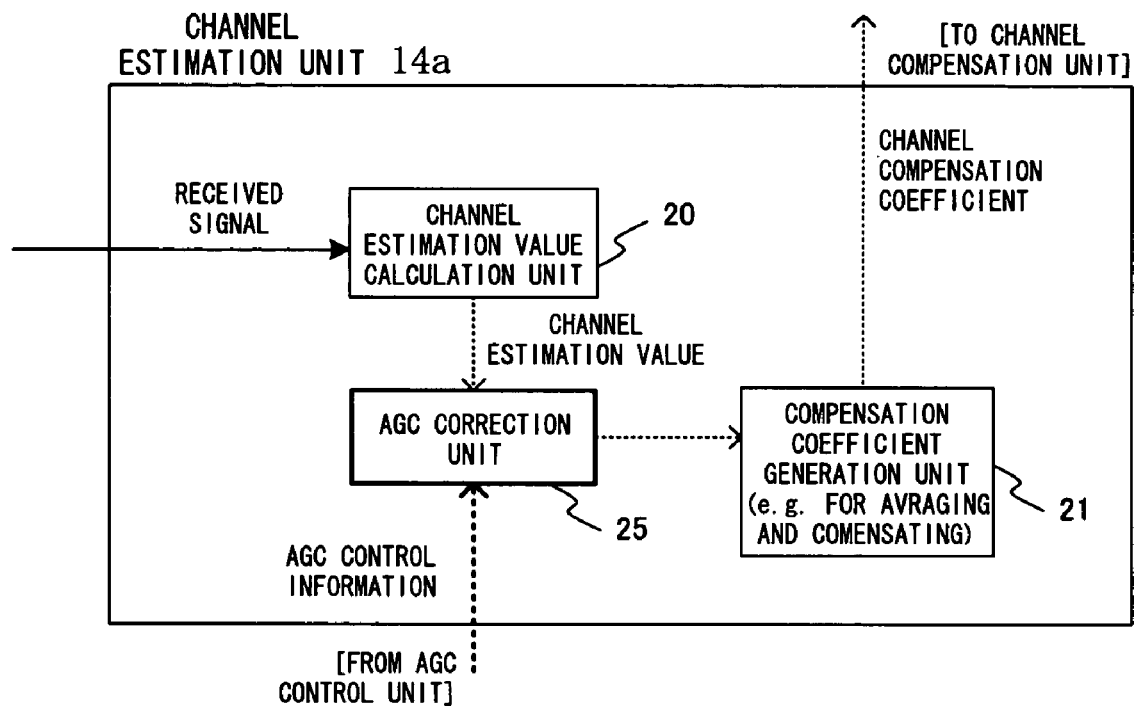
FIG. 16 shows an internal configuration of a channel estimation unit 14a in order to perform operations as shown in FIGS. 5 through 8.

FIG. 16 shows an internal configuration of a channel estimation unit 14a in order to perform operations as shown in FIGS. 5 through 8.

Figure 4:
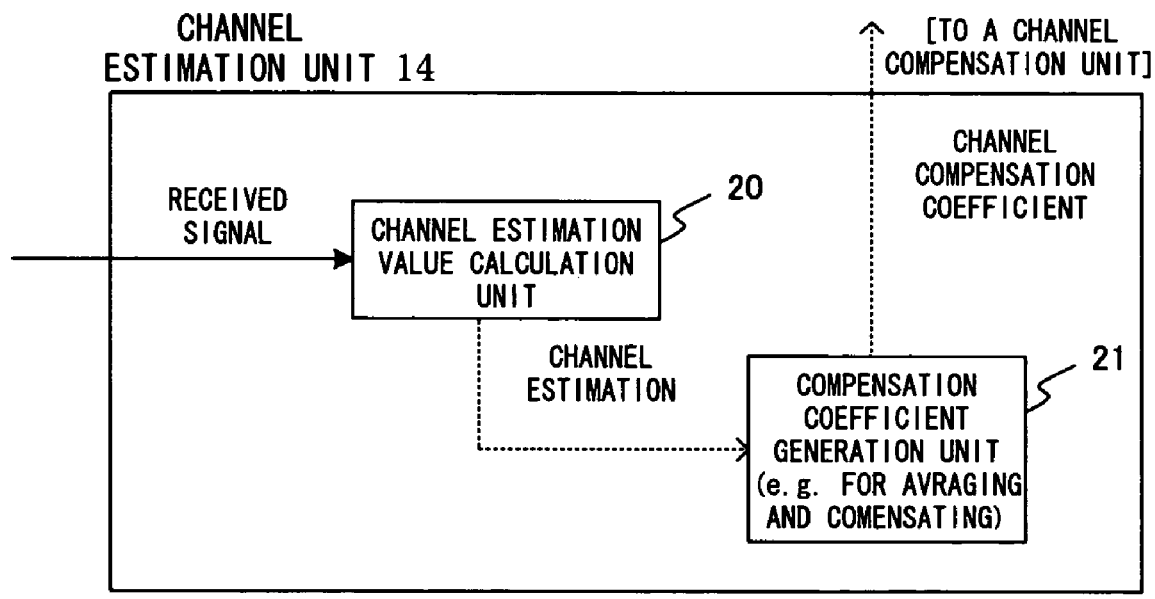
FIG. 4 is a block diagram exemplifying a configuration of a wireless receiver apparatus for a wireless telecommunication system (part 3)

In the showing of FIG. 16, the same reference signs are assigned to the same components as in FIG. 4. As a channel estimation value is calculated at a channel estimation value calculation unit 20, it is input to an AGC correction unit 25. The AGC correction unit 25 has obtained the AGC control information from the AGC control unit, and corrects a channel estimation value based thereon. A method for the correction may be a process such as the input channel estimation value multiplied by an inversed gain, et cetera. That is, when a large gain changes to a small gain, an AGC correction is for converting the both to a case of being the same gain, and therefore any method can be applied as long as the function is accomplished. An AGC-corrected channel estimation value is input to a compensation coefficient generation unit 21 and a channel compensation coefficient is calculated by averaging processing or interpolation processing based thereon. The calculated channel compensation coefficient is sent to a channel compensation unit.

Note that, in the configuration shown in FIG. 16, the compensation coefficient generation unit 21 generates a channel compensation coefficient by the method of averaging or interpolating respective channel estimation values of two reference symbols.

Figure 17:
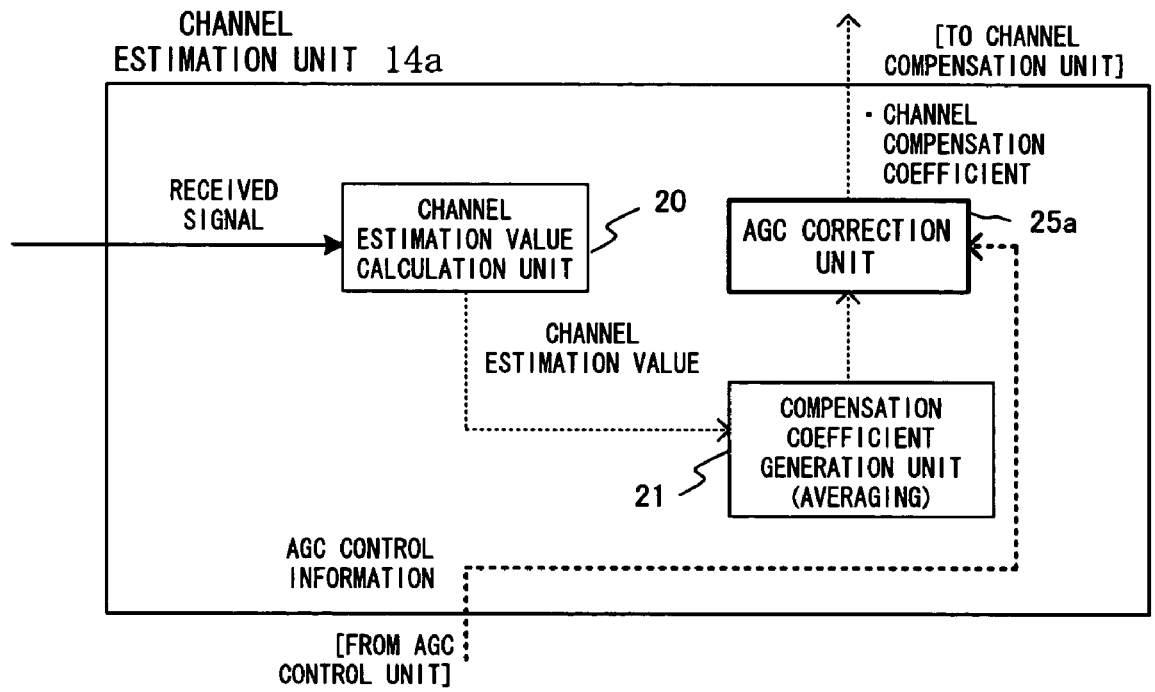
FIG. 17 shows an internal configuration of a channel estimation unit 14a in order to implement FIGS. 5 and 9.

FIG. 17 shows an internal configuration of a channel estimation unit 14a in order to implement FIGS. 5 and 9.

In the showing of FIG. 17, the same reference signs are assigned to the same components as in FIG. 4. In the case of FIG. 9, a channel estimation value per se is not corrected, whereas a channel compensation coefficient used for channel compensation carried out for a data symbol is corrected. Therefore, an AGC correction unit 25a is installed at the rear stage of the compensation coefficient generation unit 21. The AGC correction unit 25a receives, as AGC information, a timing at which the AGC gain has been changed and the post-change AGC gain. If a change timing of AGC gains is after processing the reference symbol and also a timing at which a data symbol is being processed, then the channel compensation coefficient acquired at the compensation coefficient generation unit 21 is not a gain of a data symbol to be subjected to a channel compensation, and therefore the channel estimation value is corrected by the method of multiplying a ratio of a post-change gain to a pre-change gain by the channel compensation coefficient, et cetera, and is sent to the channel compensation unit.

The case of FIG. 5 does not require an AGC correction and therefore the AGC correction unit 25a passes an input to an output as is or multiplies the channel compensation coefficient by "1".

Note that in the configuration shown in FIG. 17, the compensation coefficient generation unit 21 generates a channel compensation coefficient by the method of averaging channel estimation values of two reference symbols.

Figure 18:
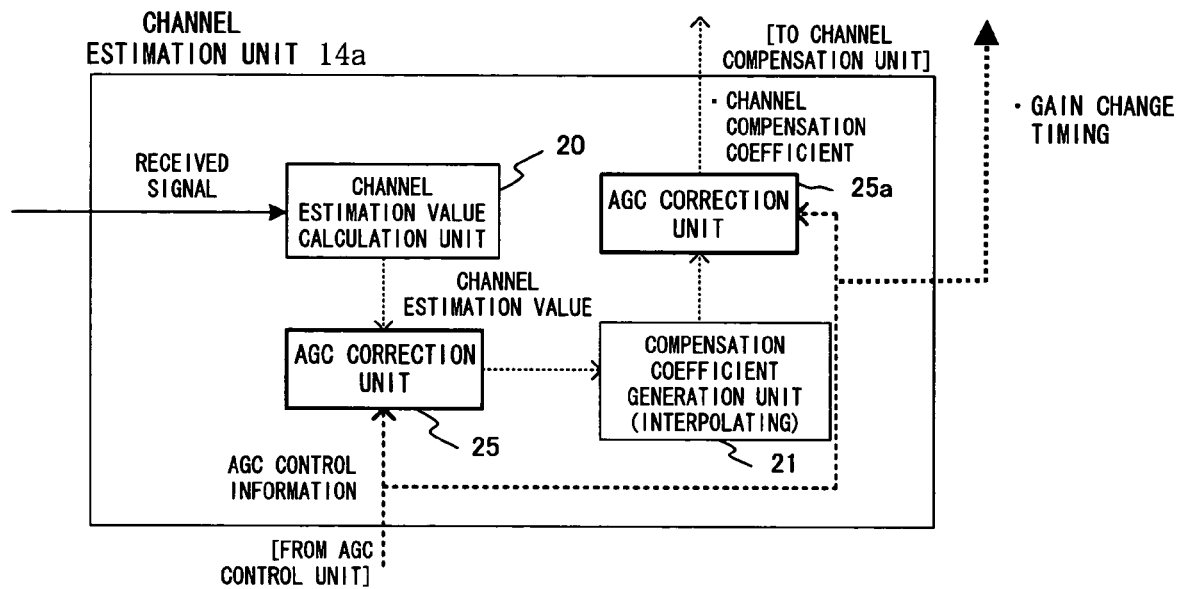
FIG. 18 shows an internal configuration of a channel estimation unit 14a in order to implement FIGS. 6 and 10.

FIG. 18 shows an internal configuration of a channel estimation unit 14a in order to implement FIGS. 6 and 10.

In the showing of FIG. 18, the same reference signs are assigned to the same components as in FIGS. 16 and 17. The configuration shown in FIG. 18 is a combination of the configurations shown in FIGS. 16 and 17. The case of FIG. 10 needs an AGC correction of a channel estimation value and that of a channel compensation coefficient. Therefore, the configuration shown in FIG. 18 is equipped with an AGC correction unit 25 for correcting a channel estimation value and is equipped with an AGC correction unit 25a for correcting a channel compensation coefficient. The AGC correction unit 25 corrects a channel estimation value by multiplying an inversed gain according to a change of AGC gains as in the case of FIG. 16.

The AGC correction unit 25a, as in the case of FIG. 17, corrects a channel compensation coefficient by the method of multiplying the ratio of a post-change gain to a pre-change gain by a channel compensation coefficient, et cetera, and sends it to the channel compensation unit. Note that, if a gain changes at the position of a data symbol, a channel compensation of a post-gain change data symbol needs a post-change channel estimation value, and therefore, also gain change timing information is transmitted to the transmission compensation unit so as to make it store the data symbol in memory during the period from a gain change to an acquisition of a channel compensation coefficient.

The case of FIG. 6 does not require an AGC correction, and therefore the AGC correction units 25 and 25a do not operate and instead pass an input to an output as is, or output it by multiplying the input by "1".

Note that in the configuration shown in FIG. 18, the compensation coefficient generation unit 21 generates a channel compensation coefficient by the method of interpolating respective channel estimation values of two reference symbols.

FIG. 19 shows an internal configuration of a channel estimation unit 14a in order to implement FIGS. 11 through 13.

In the showing of FIG. 19, the same reference signs are assigned to the same components as in FIG. 4. The case of FIG. 19, not requiring an AGC correction, carries out a channel compensation by using a channel estimation value obtained under the condition of the same gain as a data symbol to be subjected to a channel compensation. Accordingly, AGC control information is input to the compensation coefficient generation unit 21 which then obtains a timing, at which a gain changed, from the AGC control information, carries out channel compensation of the data symbol by using the input channel estimation value before the gain change, while, after the gain change, makes the channel compensation unit perform a channel compensation of the post-gain change data symbol by using a channel estimation value obtained immediately after the gain change. For this, the gain change time is also sent to the channel compensation unit.

Figure 20A:
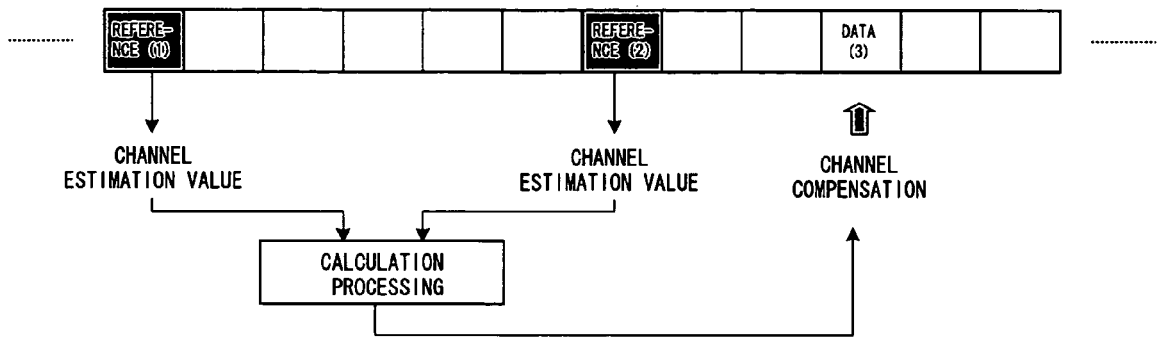
FIGS. 20A through 20C describe channel compensation and an AGC correction.
Figure 20B:
Figure 20C:

FIGS. 20A through 20C describe channel compensation and an AGC correction.

A concept of channel compensation is shown here before describing a processing content of an AGC correction.

Here, a reference transmission symbol is defined as $r_{TX}$, and a reference received symbol is defined as $r_{RX}$. A data transmission symbol is defined as $d_{TX}$, and a data received symbol is defined as $d_{RX}$. Meanwhile, a channel response is defined as c, and an AGC gain is defined as a.

In the frame configuration shown in FIG. 20a, it is considered to demodulate a data signal (3) from a reference signal (1) and reference signal (2). In this event, ignoring a noise component for simplicity, the expressions [1] through [3] can be held true:

$$r_{RX(1)} = a_{(1)} * c_{(1)} r_{TX(1)}.$$ [1]

$$r_{RX(2)} = a_{(2)} * c_{(2)} r_{TX(2)}.$$ [2]

$$d_{RX(3)} = a_{(3)} * c_{(3)} d_{TX(3)}.$$ [3]

Meanwhile, considering by ignoring a channel variation amount due to timing difference, a channel estimation is carried out by averaging as the expression [4] in order to suppress a noise component:

$$c_{(3)} = ((c)_{(1)} + c_{(2)})/2.$$ [4]

Roughly speaking, "channel estimation" corresponds to estimating a channel response c from a known reference transmission symbol $r_{TX}$ and a known reference received symbol $r_{RX}$. Meanwhile, "channel compensation" corresponds to deriving an estimation value of a data transmission symbol $d_{TX}$ from a known data received symbol $d_{RX}$ and a channel estimation result c.

A channel estimation in the case of AGC gain difference being nonexistent is explained by referring to FIG. 20B as an example. Since the AGC gains are equivalent, the expression [5] is true:

$$a_{(1)} = a_{(2)} = a_{(3)}$$ [5]

And, the expressions [1] and [2] allow to lead to $a_{(1)}*c_{(1)}$ and $a_{(2)}*c_{(2)}$, while the expressions [4] and [5] acquire $a_{(3)}*c_{(3)}$ by way of the expression [6]:

$$a_{(3)}*c_{(3)} = \{a_{(1)}*c_{(1)} + a_{(2)}*c_{(2)}\}/2.$$ [6]

That is, the expressions [3] and [6] make it possible to lead to an estimation value of a data transmission symbol $d_{TX}$.

A channel estimation in the case of an AGC gain difference being existent is explained by referring to FIG. 20C as an example.

AGC gains are different among each symbol, hence the expression [7] is true:

$$a_{(1)} \neq a_{(2)} = a_{(3)}.$$ [7]

And, the expressions [1] and [2] allow to lead to $a_{(1)}*c_{(1)}$ and $a_{(2)}*c_{(2)}$, while the expressions [4] and [7] acquire $a_{(3)}*c_{(3)}$ by way of the expression [8]:

$$a_{(3)}*c_{(3)} = \{(a_{(3)}/a_{(1)})*a_{(1)}*c_{(1)} + a_{(2)}*c_{(2)}\}/2.$$ [8]

That is, as it is apparent by comparing the expression [8] with [6], processing of multiplying the reference signal (1) by $(a_{(3)}/a_{(1)})$ corresponds to "AGC correction" processing at the AGC correction unit.

Note that the case of a linear interpolation can be considered the same as the channel compensation by averaging processing as described above.

What is claimed is:

1. A wireless receiver apparatus which comprises an amplification unit, being controlled by a constant gain control, for amplifying a received signal, comprising:
    a gain value acquisition unit for acquiring a gain value of the amplification unit; and
    a channel compensation unit for acquiring a channel estimation value by using a reference symbol included in a data frame, and carrying out a channel compensation by modifying the channel estimation value in consideration of a difference of the gain values if a gain value of the amplification unit at the time of the channel estimation value being acquired is different from the one at the time of a data symbol to be subjected to a channel compensation being acquired when subjecting the data symbol to a channel compensation.

2. The wireless receiver apparatus according to claim 1, wherein
    a channel estimation value using a reference symbol which is acquired under the condition of a gain value different from a gain value of said amplification unit at the time of said data symbol being acquired is not used for a channel compensation of the data symbol.

3. The wireless receiver apparatus according to claim 1, wherein
    a channel compensation of a data symbol is performed by adding a correction based on a difference of gain values to a channel estimation value using a reference symbol acquired under the condition of a gain value which is different from that of said amplification unit at the time of the data symbol being acquired in the case of carrying out a channel compensation of the data symbol by using a reference symbol of a data frame containing the data symbol to be subjected to a channel compensation and using a channel estimation value of the reference symbol of the preceding frame.

4. The wireless receiver apparatus according to claim 3, wherein
said channel compensation of said data symbol is carried out by using a channel estimate value acquired based on a certain reference symbol and the average of corrected channel estimation values which are acquired based on other reference symbols.

5. The wireless receiver apparatus according to claim 1, wherein
a channel compensation of a data symbol is performed by adding a correction based on a difference of gain values to a channel estimation value using a reference symbol acquired under the condition of a gain value which is different from that of said amplification unit at the time of the data symbol being acquired in the case of carrying out a channel compensation of the data symbol by using a reference symbol of a data frame containing the data symbol to be subjected to a channel compensation and using a channel estimation value of the reference symbol of the succeeding frame.

6. The wireless receiver apparatus according to claim 5, wherein
said channel compensation of said data symbol is carried out by using a channel estimate value acquired based on a certain reference symbol and an interpolation of corrected channel estimation values which are acquired based on other reference symbols.

7. The wireless receiver apparatus according to claim 1, wherein
a channel compensation is carried out after correcting a compensation coefficient used for the channel compensation of a data symbol based on a difference of gain values if a gain value of said amplification unit at the time of said reference symbol being acquired is different from that of the amplification unit at the time of the data symbol to be subjected to a channel compensation being acquired.

8. The wireless receiver apparatus according to claim 1, wherein
said gain value includes a rotation amount of a phase of a signal as information in addition to a variation amount of an amplitude of a signal.

9. A channel compensation method used for a wireless receiver apparatus comprising an amplification unit, which is controlled by a gain constant control, for amplifying a received signal, comprising:
acquiring a gain value of the amplification unit; and
acquiring a channel estimation value by using a reference symbol included in a data frame, and carrying out a channel compensation by modifying the channel estimation value in consideration of a difference of the gain values if a gain value of the amplification unit at the time of the channel estimation value being acquired is different from the one at the time of a data symbol to be subjected to a channel compensation being acquired when subjecting the data symbol to a channel compensation.

10. A wireless receiver apparatus which comprises an amplification unit, being controlled by a constant gain control, for amplifying a received signal, comprising:
a gain value acquisition unit for acquiring a gain value of the amplification unit; and
a channel compensation unit for acquiring a channel estimation value by using a reference symbol included in a data frame, and carrying out a channel compensation by considering a difference of the gain values if a gain value of the amplification unit at the time of the channel estimation value being acquired is different from the one at the time of a data symbol to be subjected to a channel compensation being acquired when subjecting the data symbol to a channel compensation, wherein
a channel estimation value using a reference symbol which is acquired under the condition of a gain value different from a gain value of said amplification unit at the time of said data symbol being acquired is not used for a channel compensation of the data symbol.

11. A channel compensation method used for a wireless receiver apparatus comprising an amplification unit, which is controlled by a gain constant control, for amplifying a received signal, comprising:
acquiring a gain value of the amplification unit; and
acquiring a channel estimation value by using a reference symbol included in a data frame, and carrying out a channel compensation by considering a difference of the gain values if a gain value of the amplification unit at the time of the channel estimation value being acquired is different from the one at the time of a data symbol to be subjected to a channel compensation being acquired when subjecting the data symbol to a channel compensation, wherein
a channel estimation value using a reference symbol which is acquired under the condition of a gain value different from a gain value of said amplification unit at the time of said data symbol being acquired is not used for a channel compensation of the data symbol.

12. A channel compensation method used for a wireless receiver apparatus comprising an amplification unit, which is controlled by a gain constant control, for amplifying a received signal, comprising:
acquiring a gain value of the amplification unit; and
acquiring a channel estimation value by using a reference symbol included in a data frame, and carrying out a channel compensation by considering a difference of the gain values if a gain value of the amplification unit at the time of the channel estimation value being acquired is different from the one at the time of a data symbol to be subjected to a channel compensation being acquired when subjecting the data symbol to a channel compensation, wherein
a channel compensation of a data symbol is performed by adding a correction based on a difference of gain values to a channel estimation value using a reference symbol acquired under the condition of a gain value which is different from that of said amplification unit at the time of the data symbol being acquired in the case of carrying out a channel compensation of the data symbol by using a reference symbol of a data frame containing the data symbol to be subjected to a channel compensation and using a channel estimation value of the reference symbol of the preceding frame.

* * * * *